(No Model.)

C. E. WRIGHT.
COTTON HARVESTER.

No. 339,725. Patented Apr. 13, 1886.

Witnesses:
L. C. Hills
W. B. Masson

Inventor
Charles E. Wright
by E. E. Masson
atty.

UNITED STATES PATENT OFFICE.

CHARLES E. WRIGHT, OF VICKSBURG, MISSISSIPPI.

COTTON-HARVESTER.

SPECIFICATION forming part of Letters Patent No. 339,725, dated April 13, 1886.

Application filed August 17, 1883. Serial No. 103,962. (No model.)

*To all whom it may concern:*

Be it known that I, CHARLES E. WRIGHT, a citizen of the United States, residing at Vicksburg, in the county of Warren and State of Mississippi, have invented certain new and useful Improvements in Cotton-Harvesters, of which the following is a specification, reference being had therein to the accompanying drawings, in which—

Figure 1:
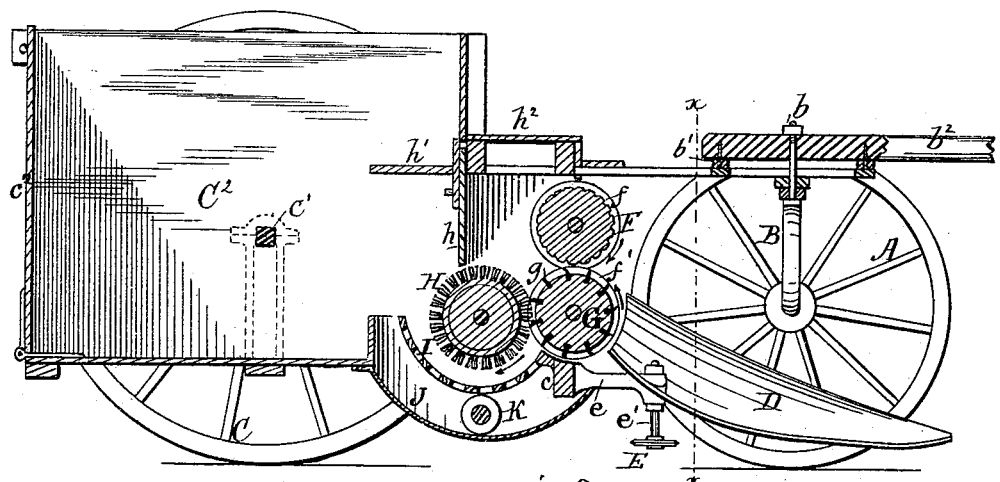
Figure 2:
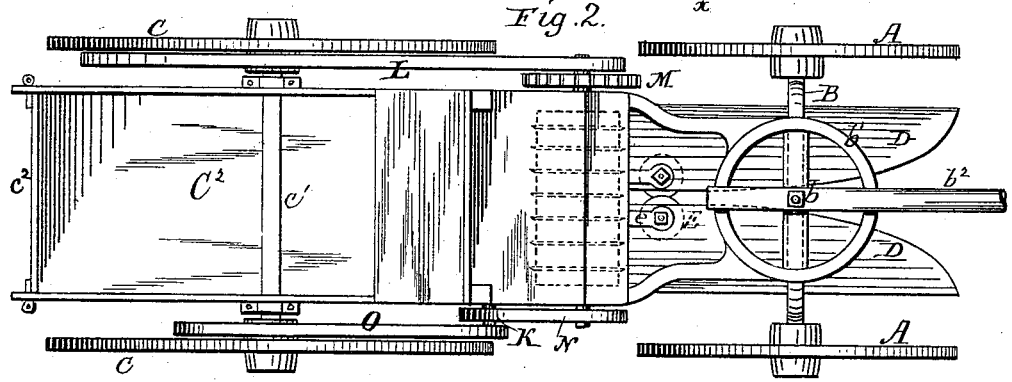
Figure 3:
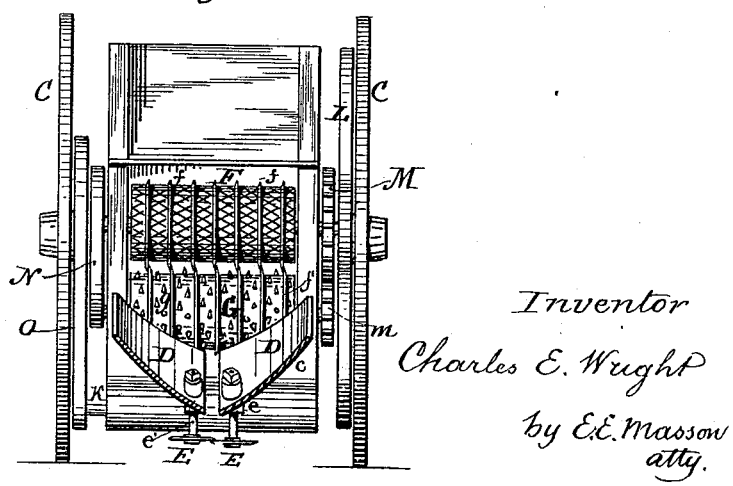

Figure 1 is a central vertical longitudinal section, Fig. 2 a plan, and Fig. 3 a transverse vertical section, on line $x\,x$ of Fig. 1, of a cotton-harvester constructed in accordance with my invention.

The invention herein described relates to an improvement in straddle-row cotton-harvesting machines, and the novel features of the same will be hereinafter fully described, and specifically set forth in the claims.

The general object of the invention is to provide a machine which will, as it advances along a row of cotton-plants, sever the stalks at a point a short distance above the ground and below its branches, and receive the severed portion of the plant and cut, break, disintegrate, and separate the branches, twigs, and bolls from each other and deliver the same into a receiver forming a part of and moving with the harvester, from which receiver the same is removed to be further separated and ginned by any usual well-known mechanism, the whole crop being thus gathered and removed at once, and the field placed in condition to be plowed.

A represents the front wheels of the harvester, and B an upwardly-arched axle supporting the forward end of the harvester framework, through which the king-bolt $b$ extends, the frame-work comprising at that portion a fifth-wheel, $b'$, and a draft-pole, $b^2$, to adapt the same to be drawn by a team in any direction after the manner of ordinary wagons.

C represents the rear wheels of the harvester. They are united either by the straight axle $C'$, or said axle may be downwardly bent and pass under the rear portion of the harvester, hereinafter designated as the "receiver" $C^2$.

At the front of the harvester is a collecting and directing trough, D, having a slot or passage at its bottom the sides of which are converging toward the rear.

From the lower portion of the front wall, $c$, of the receiver $C^2$ project two brackets, $e$, which are adapted to support each a blade, E. In this instance each blade is a disk supported in the bracket by a bolt, $e'$, in the bracket $e$, and is supported in such a position as to overlap the edge of its companion disk, as clearly shown in Fig. 3.

Within the front wall of the receiver $C^2$ are arranged two horizontal rolls, F G, the former being corrugated upon its periphery and provided with circular cutters $f$, transversely arranged about four inches apart upon its surface, to sever the stalk and branches of the cotton-plant into short pieces, and the latter roll being provided with similar cutters, $f'$, bearing against the edge of the cutters $f$, and intermediately-arranged teeth $g$.

Adjacent to and parallel with the roll G is a rotary brush, H, to remove any cotton or other parts of the cotton-plant adhering to the teeth $g$. Beneath the brush is arranged a perforated concave, I, through which the chopped stalk and branches of the plant can escape, and beneath this concave is a dust and trash chamber, J, in the bottom of which is a transversely-arranged conveyer, K.

Above the revolving brush H is an adjustable or vertically-sliding gate, $h$, to prevent cotton being carried around the brush, and across the front end of the receiver is a platform, $h'$, upon which an operator may stand for the purpose of removing the cotton, its bolls, and branches to the rear end of the receiver, when not engaged in tramping the cotton into said receiver.

At $h^2$ is a platform for the use of the driver.

In operation the roll G is driven faster than the roll F, and the brush H is driven faster than the roll G, the contact-surfaces of all moving in the same direction, and each being supported in adjustable bearings, whereby the distance of the roll F or the brush H from the roll G may be varied, as desired.

I do not limit myself to any particular means of operating the rolls and brush, nor to any particular train of gearing for giving to each its described relative speed of rotation. In this instance I operate the rolls by communicating to them the motion of one of the rear wheels of the harvester, and I operate the conveyer K from the other of the rear wheels of the harvester. A belt, L, extends from a large pulley on the inside of the hind wheel of the harvester to a pulley on the shaft of roll F. A large gear, M, on said shaft meshes with a smaller gear, $m$, on a shaft of roll G, and either a belt, N, from a large pulley on the shaft of roll F operates upon a small pulley on the shaft of the brush H, or said brush can be rotated by means of a small gear upon its shaft meshing with a larger gear upon the shaft of the bottom roll, G, the rolls and brush rotating in the direction indicated by arrows. A belt, O, extending from a pulley on the opposite wheel operates the conveyer K.

I do not limit myself to the exact details of construction herein described and illustrated. I may, if desired, rotate the cutting-disks E positively by means of a cross-belt passing around pulleys upon their shafts, and connected, for example, with a pulley upon the shaft of the conveyer. Said disks may be of any desired shape or construction, the only requisite being that a cutting edge or device or devices shall be located so that when the machine advances the stalks of the plants shall be severed close to the ground. For this purpose horizontally-disposed revolving saws may be employed. Furthermore, the surface of the upper roll may be provided with teeth, and saws may take the place of the rotary cutters. Various other modifications will suggest themselves to persons skilled in cotton-harvesting devices, which I deem as embraced within my invention. For example, the conveyer K and the dust-chamber J may be dispensed with, in which case substances passing through the concave I would fall directly upon the ground.

For convenience in emptying the receiver, the rear wall or tail-gate $c^2$ thereof is hinged to the bottom, whereby it may be let down as a door or as a chute.

The operation of my invention is as follows: The harvester is drawn along, straddling a row of plants, the stalks of which pass upwardly through the slot in the bottom of the trough D. The upper branches are caught and brought between the rolls F G, while the stalks themselves are severed by the cutters E. The transverse cutters $f$, arranged in pairs upon the rolls F G, sever the branches and stalk into short pieces, and the teeth $g$ act to break up the bolls, which operation is aided by the corrugated or roughened surface of the roll F. The product is now delivered upon the brush H, which directs it upon the concave I, and from thence into the receiver, at the same time cleaning the teeth of adhering cotton. Such heavier particles as pass through the slots of the concave into the dust-chamber are delivered therefrom at the side of the machine by the conveyer.

The concave I, or the slats of which its bottom is constructed, may be subjected to a shaking motion by mechanism well known in grain cleaning and separating machines, to facilitate the passage of pieces of the stalks and branches of the cotton-plants, and their separation from the bolls of cotton carried by the brush, and said concave may be made of wire-cloth or the slats be provided with hair or brushes.

What I claim is—

1. In a cotton-harvester provided with cutting-disks E E, the combination of a horizontal toothed roll, and a companion roll provided with circular blades and arranged across the front of the machine and horizontally, substantially as specified.

2. In a cotton-harvester, the combination of horizontal rolls and transversely-arranged cutting-blades thereon, and a horizontal rotary brush, each adapted to be operated at a different speed from the others, substantially as specified.

3. The combination of the longitudinal guide D, cutters E thereunder, and rolls F G, substantially as shown and described.

4. The combination of the guide D, cutters E, rolls F G, provided with transverse cutters $f'$, brush H, and concave I, substantially as shown and described.

5. In a cotton-harvester, the combination of the corrugated roll F, having cutters $f$, with the toothed roll G, having the cutters $f'$, substantially as shown and described.

6. With the frame of a cotton-harvester, the combination of horizontal rolls F G and brush H, gate $h$, concave I, chamber J, and conveyer, substantially as shown and described.

7. The combination of the horizontal rolls F G and brush H with receiver C², having the hinged end wall, $c^2$, substantially as shown and described.

In testimony whereof I affix my signature in presence of two witnesses.

CHARLES E. WRIGHT.

Witnesses:
N. PICARD,
E. E. MASSON.